US011739737B2

(12) United States Patent
Foshansky et al.

(10) Patent No.: US 11,739,737 B2
(45) Date of Patent: Aug. 29, 2023

(54) SHAPE MEMORY ALLOY FILAMENT CRIMPING ELEMENT

(71) Applicant: Autosplice, Inc., San Diego, CA (US)

(72) Inventors: Leonid Foshansky, San Diego, CA (US); Vishnu Naidu, San Diego, CA (US); Kenneth Krone, San Diego, CA (US)

(73) Assignee: AUTOSPLICE, INC., San Diego, CA (US)

( * ) Notice: Subject to any disclaimer, the term of this patent is extended or adjusted under 35 U.S.C. 154(b) by 485 days.

(21) Appl. No.: 16/270,459

(22) Filed: Feb. 7, 2019

(65) Prior Publication Data
US 2019/0242370 A1    Aug. 8, 2019

Related U.S. Application Data

(60) Provisional application No. 62/627,539, filed on Feb. 7, 2018.

(51) Int. Cl.
| | |
|---|---|
| *H01R 4/18* | (2006.01) |
| *F03G 7/06* | (2006.01) |
| *H01R 4/01* | (2006.01) |
| *H01R 43/048* | (2006.01) |

(52) U.S. Cl.
CPC .............. *F03G 7/065* (2013.01); *H01R 4/01* (2013.01); *H01R 4/18* (2013.01); *H01R 4/188* (2013.01); *H01R 43/048* (2013.01)

(58) Field of Classification Search
None
See application file for complete search history.

(56) References Cited

U.S. PATENT DOCUMENTS

| | | | |
|---|---|---|---|
| 2,854,648 A | 9/1958 | Berg | |
| 2,965,699 A | 12/1960 | Bollmeier | |
| 3,095,468 A * | 6/1963 | Klein | H01R 4/186 |
| | | | 174/88 R |
| 3,438,407 A | 4/1969 | Over | |
| 3,852,702 A * | 12/1974 | Dowling | H01R 4/26 |
| | | | 439/409 |

(Continued)

FOREIGN PATENT DOCUMENTS

| | | | |
|---|---|---|---|
| DE | 102014217731 A1 * | 3/2016 | ............ H01R 43/04 |
| EP | 0785709 | 7/1997 | |

(Continued)

*Primary Examiner* — Felix O Figueroa
(74) *Attorney, Agent, or Firm* — GARSON & GUTIERREZ, PC

(57) ABSTRACT

Apparatus and methods for filament crimping. The apparatus includes a filament crimp element. The filament crimp element includes a first set of cavities disposed at a spacing which creates a first set of features and a second set of cavities disposed at a spacing which creates a second set of features. The first and second set cavities are substantially opposite one another. The first set of features are adapted to be placed at least partially within the second set of cavities and the second set of features are adapted to be placed at least partially within the first set of cavities. Interlock features configured for cold welding are also included. Methods for the manufacture of the device are also disclosed. In addition, methods for automated placement and manufacture of assemblies using the crimp elements are also disclosed.

17 Claims, 4 Drawing Sheets

(56) References Cited

U.S. PATENT DOCUMENTS

| | | | |
|---|---|---|---|
| 3,879,981 A | 4/1975 | Richards | |
| 3,947,082 A * | 3/1976 | Bender | H01R 4/2495 |
| | | | 439/421 |
| 3,954,547 A | 5/1976 | Genthner | |
| 3,989,339 A * | 11/1976 | Haitmanek | H01R 4/188 |
| | | | 439/421 |
| 4,043,174 A | 8/1977 | Paolino | |
| 4,461,527 A | 7/1984 | Izraeli | |
| 4,551,974 A | 11/1985 | Yaeger et al. | |
| 4,806,815 A | 2/1989 | Honma | |
| 5,312,152 A | 5/1994 | Woebkenberg, Jr. et al. | |
| 5,440,193 A | 8/1995 | Barrett | |
| 5,486,653 A | 1/1996 | Dohi | |
| 5,563,466 A | 10/1996 | Rennex et al. | |
| 5,685,148 A | 11/1997 | Robert | |
| 5,763,979 A | 6/1998 | Mukherjee et al. | |
| 5,870,007 A | 2/1999 | Carr et al. | |
| 5,938,996 A | 8/1999 | Bianca et al. | |
| 6,004,171 A | 12/1999 | Ito et al. | |
| 6,056,605 A | 5/2000 | Nguyen et al. | |
| 6,232,555 B1 | 5/2001 | Besler et al. | |
| 6,236,300 B1 | 5/2001 | Winners | |
| 6,326,707 B1 | 12/2001 | Gummin et al. | |
| 6,379,393 B1 | 4/2002 | Mavroidis et al. | |
| 6,425,829 B1 | 7/2002 | Julien | |
| 6,574,958 B1 | 6/2003 | MacGregor | |
| 6,749,457 B2 | 6/2004 | Sakaguchi et al. | |
| 6,799,990 B2 | 10/2004 | Wendling et al. | |
| 6,832,477 B2 | 12/2004 | Gummin et al. | |
| 6,881,104 B2 * | 4/2005 | Suzuki | H01R 4/186 |
| | | | 439/877 |
| 6,893,274 B2 | 5/2005 | Chen et al. | |
| 7,624,768 B2 | 12/2009 | Neet et al. | |
| 7,650,914 B2 | 1/2010 | Bogursky et al. | |
| 8,113,243 B2 * | 2/2012 | Bogursky | H01R 43/048 |
| | | | 140/105 |
| 10,594,048 B2 * | 3/2020 | Bluemmel | H01R 4/188 |
| 2002/0185932 A1 | 12/2002 | Gummin et al. | |
| 2004/0256920 A1 | 12/2004 | Gummin et al. | |
| 2005/0229670 A1 | 10/2005 | Perreault | |
| 2005/0273020 A1 | 12/2005 | Whittaker et al. | |
| 2005/0273059 A1 | 12/2005 | Mernoe et al. | |
| 2005/0282444 A1 | 12/2005 | Irish et al. | |
| 2019/0148703 A1 * | 5/2019 | Toth | H01R 4/28 |
| | | | 429/158 |

FOREIGN PATENT DOCUMENTS

| | | |
|---|---|---|
| EP | 1610418 | 12/2005 |
| FR | 2673323 | 8/1992 |
| GB | 1045380 | 10/1966 |

* cited by examiner

SHAPE MEMORY ALLOY FILAMENT CRIMPING ELEMENT

PRIORITY

This application claims the benefit of priority to U.S. Provisional Patent Application Ser. No. 62/627,539 filed on Feb. 7, 2018 and entitled "Shape Memory Alloy Crimp Interlock Apparatus and Methods", the contents of which being incorporated herein by reference in its entirety.

RELATED APPLICATIONS

This application is related to co-owned U.S. patent application Ser. No. 13/372,199 filed on Feb. 13, 2012 and entitled "Apparatus and Methods for Filament Crimping and Manufacturing", now U.S. Pat. No. 8,939,180; which is a divisional of and claims priority to co-owned U.S. patent application Ser. No. 12/892,208 filed Jul. 1, 2010 of the same title, now U.S. Pat. No. 8,113,243; which is a divisional of and claims priority to co-owned U.S. patent application Ser. No. 12/691,562 filed Jan. 21, 2010 of the same title, now U.S. Pat. No. 7,926,520, which is a divisional of and claims priority to co-owned U.S. patent application Ser. No. 11/473,567 filed Jun. 22, 2006 of the same title, now U.S. Pat. No. 7,650,914, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNOLOGICAL FIELD

The present invention relates generally to the field of crimping, and in one salient aspect to fine filament crimping of, e.g., shaped memory alloy (SMA) wire.

2. DESCRIPTION OF RELATED TECHNOLOGY

The crimping of filaments such as metallic wires is well understood. Numerous techniques and configurations for wire and filament crimps are known. See for example, U.S. Pat. No. 5,486,653 to Dohi issued Jan. 23, 1996 entitled "Crimp-style terminal"; U.S. Pat. No. 6,004,171 to Ito, et al. issued Dec. 21, 1999 and entitled "Crimp-type terminal"; U.S. Pat. No. 6,056,605 to Nguyen, et al. issued May 2, 2000 entitled "Contact element with crimp section"; U.S. Pat. No. 6,232,555 to Besler, et al. issued May 15, 2001 entitled "Crimp connection"; U.S. Pat. No. 6,749,457 to Sakaguchi, et al. issued Jun. 15, 2004 entitled "Crimp terminal"; U.S. Pat. No. 6,799,990 to Wendling, et al. issued Oct. 5, 2004 entitled "Crimp connector"; and U.S. Pat. No. 6,893,274 to Chen, et al issued May 17, 2005 and entitled "Structure of ground pin for AC inlet and process for fastening wire onto same".

Similarly, the use of filaments, including those of shaped memory alloy (SMA), for various purposes is also well known. SMA generally comprises a metal that is capable of "remembering" or substantially reassuming a previous geometry. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

SMAs often find particular utility in mechanical actuation systems, in that it can be used to replace more costly, heavy, and space-consuming solenoid, motor driven, or relay devices. See for example, U.S. Pat. No. 4,551,974 to Yaeger, et al. issued on Nov. 12, 1985 and entitled "Shape memory effect actuator and methods of assembling and operating therefore"; U.S. Pat. No. 4,806,815 to Honma issued on Feb. 21, 1989 and entitled "Linear motion actuator utilizing extended shape memory alloy member"; U.S. Pat. No. 5,312,152 to Woebkenberg, Jr., et al. issued on May 17, 1994 and entitled "Shape memory metal actuated separation device"; U.S. Pat. No. 5,440,193 to Barrett issued on Aug. 8, 1995 and entitled "Method and apparatus for structural, actuation and sensing in a desired direction"; U.S. Pat. No. 5,563,466 to Rennex, et al. issued on Oct. 8, 1996 and entitled "Micro-actuator"; U.S. Pat. No. 5,685,148 to Robert issued Nov. 11, 1997 and entitled "Drive apparatus"; U.S. Pat. No. 5,763,979 to Mukherjee, et al. issued on Jun. 9, 1998 and entitled "Actuation system for the control of multiple shape memory alloy elements"; U.S. Pat. No. 5,870,007 to Carr, et al. issued on Feb. 9, 1999 to "Multi-dimensional physical actuation of microstructures"; U.S. Pat. No. 6,236,300 to Minners issued on May 22, 2001 and entitled "Bistable micro-switch and method of manufacturing the same"; U.S. Pat. No. 6,326,707 to Gummin, et al. issued on Dec. 4, 2001 and entitled "Shape memory alloy actuator"; U.S. Pat. No. 6,379,393 to Mavroidis, et al. issued on Apr. 30, 2002 and entitled "Prosthetic, orthotic, and other rehabilitative robotic assistive devices actuated by smart materials"; U.S. Pat. No. 6,425,829 to Julien issued on Jul. 30, 2002 and entitled "Threaded load transferring attachment"; U.S. Pat. No. 6,574,958 to MacGregor issued on Jun. 10, 2003 and entitled "Shape memory alloy actuators and control methods"; U.S. Pat. No. 6,832,477 to Gummin, et al. issued on Dec. 21, 2004 and entitled "Shape memory alloy actuator"; U.S. Patent Publication No. 20020185932 to Gummin, et al. published on Dec. 12, 2002 and entitled "Shape memory alloy actuator"; U.S. Patent Publication No. 20040256920 to Gummin, et al. published on Dec. 23, 2004 entitled "Shape memory alloy actuators"; U.S. Patent Publication No. 20050229670 to Perreault, published on Oct. 20, 2005 and entitled "Stent crimper"; U.S. Patent Publication No. 20050273020 to Whittaker, et al. published on Dec. 8, 2005 and entitled "Vascular guidewire system"; and U.S. Patent Publication No. 20050273059 to Mernoe, et al, published Dec. 8, 2005 and entitled "Disposable, wearable insulin dispensing device".

Despite the broad range of crimp technologies and implementations of SMA filaments, there has heretofore been significant difficulty in effectively crimping SMA filament wire when finer wire gauge sizes are chosen. Specifically, prior art approaches to crimping such filaments (including use of serrations or "teeth" in the crimp surfaces) either significantly distort or damage the filament, thereby altering its mechanical characteristics in a deleterious fashion (e.g., reducing its tensile strength or recovery properties), or allowing it to slip or move within the crimp. These problems are often exacerbated by changes in the environment (e.g., temperature, stress, etc.) of the SMA filament and crimp. Other techniques such as brazing, soldering, and the like are also not suitable for such fine-gauge applications.

Furthermore, no suitable solution exists for maintaining a constant and uniform tensile stress on the filament during crimping. Typical SMAs such as Nitinol can recover stress induced strain by up to about eight (8) percent. Therefore, in applications where filament length is relatively small, it is critical to maintain accurate spacing of the end crimping elements connected by the SMA wire after completion of the crimping process.

There is, therefore, a salient unsatisfied need for an improved crimp apparatus and methods of manufacture that specifically accommodate finer gauge SMA filament wire assemblies, especially so as to maintain the desired degree of filament length control post-crimp for, inter alia, length-critical actuator applications.

In addition, improved apparatus and methods for the manufacture and packaging of SMA wire assemblies are also needed in order to maintain these precision assemblies cost-effective and competitive from a manufacturing perspective. Such improved manufacture and packaging approaches would also ideally be compatible with extant industry-standard equipment and techniques to the maximum degree practicable, thereby minimizing the degree of infrastructure and equipment alterations and upgrades necessary to implement the technology.

DETAILED DESCRIPTION

Reference is now made to the drawings wherein like numerals refer to like parts throughout.

BRIEF DESCRIPTION OF THE DRAWINGS

The features, objectives, and advantages of the invention will become more apparent from the detailed description set forth below when taken in conjunction with the drawings, wherein.

EXEMPLARY EMBODIMENTS

As used herein, the term "filament" refers to any substantially elongate body, form, strand, or collection of the foregoing, including without limitation drawn, extruded or stranded wires or fibers, whether metallic or otherwise.

As used herein, the term "shape memory alloy" or "SMA" shall be understood to include, but not be limited to, any metal that is capable of "remembering" or substantially reassuming a previous geometry. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

SMA Interlock Assembly—

Figure 1A:
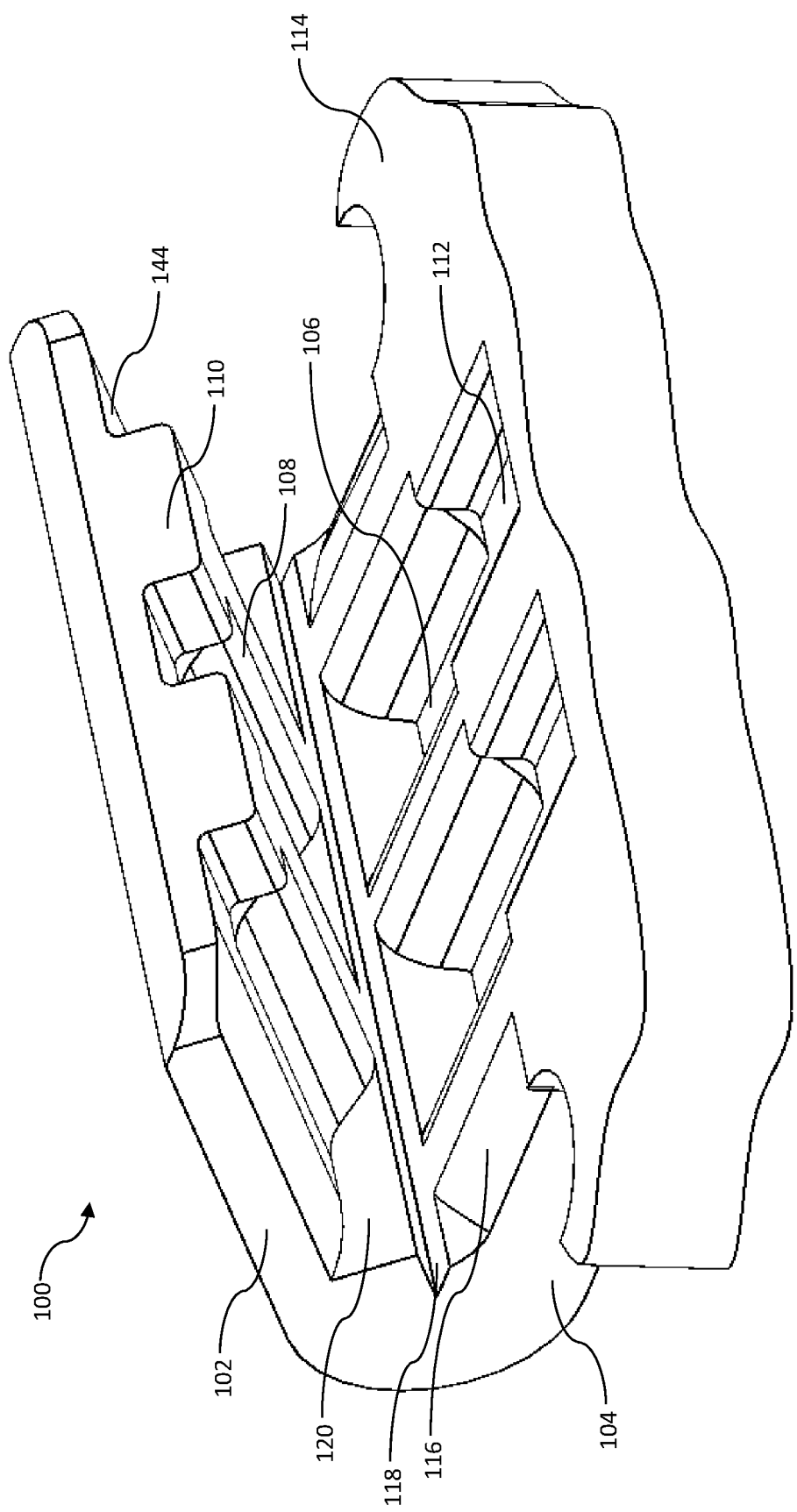
FIG. 1A is a perspective view of an exemplary shape memory alloy interlock assembly prior to crimping, in accordance with the principles of the present disclosure.
Figure 1B:
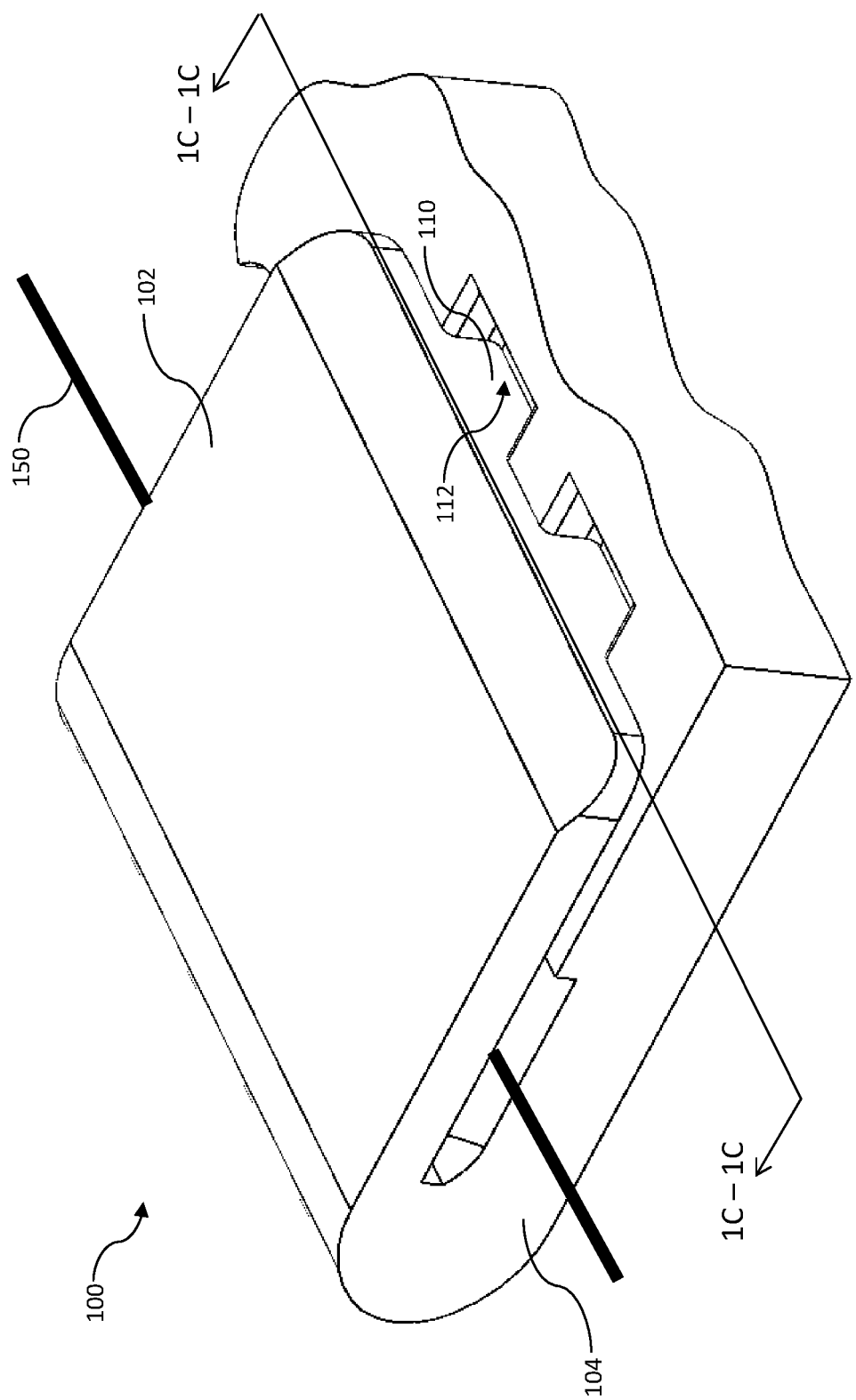
FIG. 1B is a perspective view of the shape memory alloy interlock assembly of FIG. 1A showing a shape memory alloy filament crimped therein, in accordance with the principles of the present disclosure.
Figure 1C:
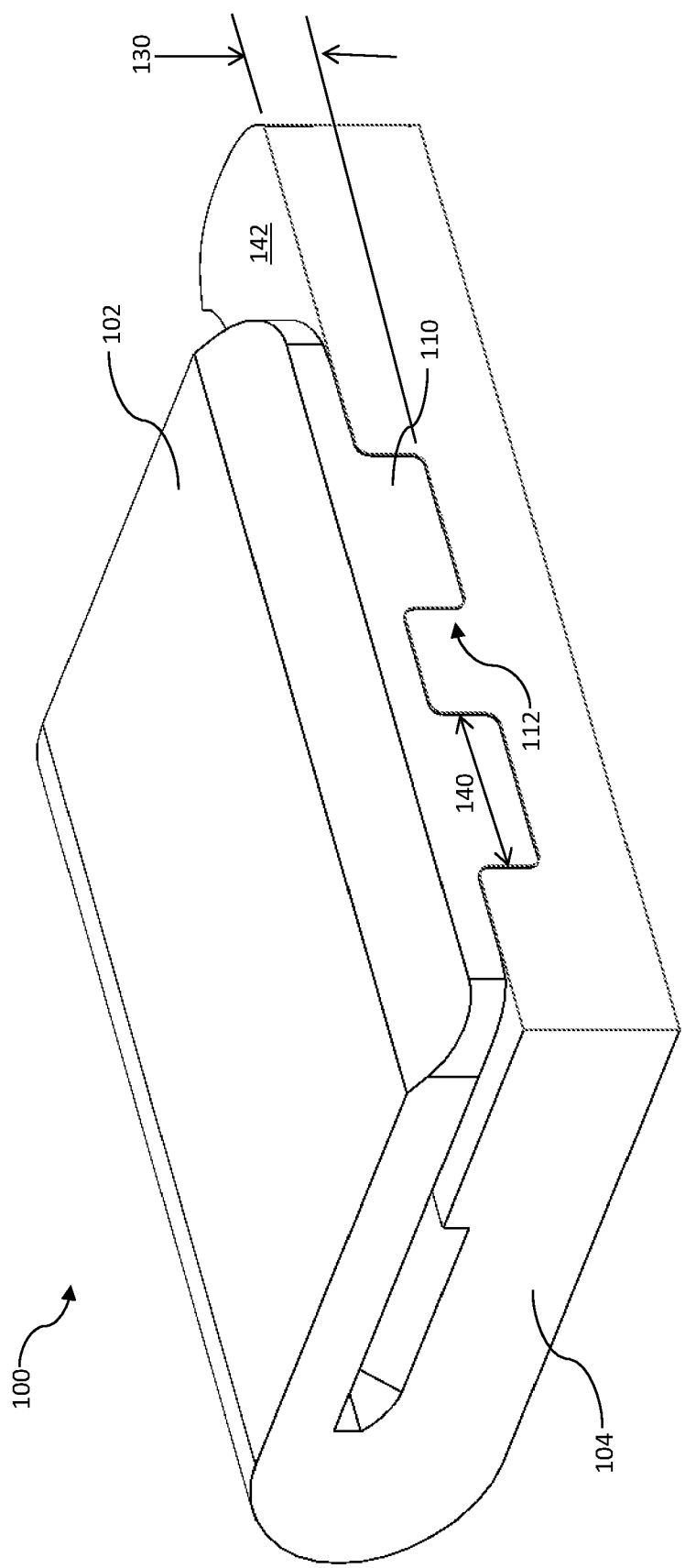
FIG. 1C is a cross sectional view of the shape memory alloy interlock assembly of FIG. 1A, in accordance with the principles of the present disclosure.
Figure 2:
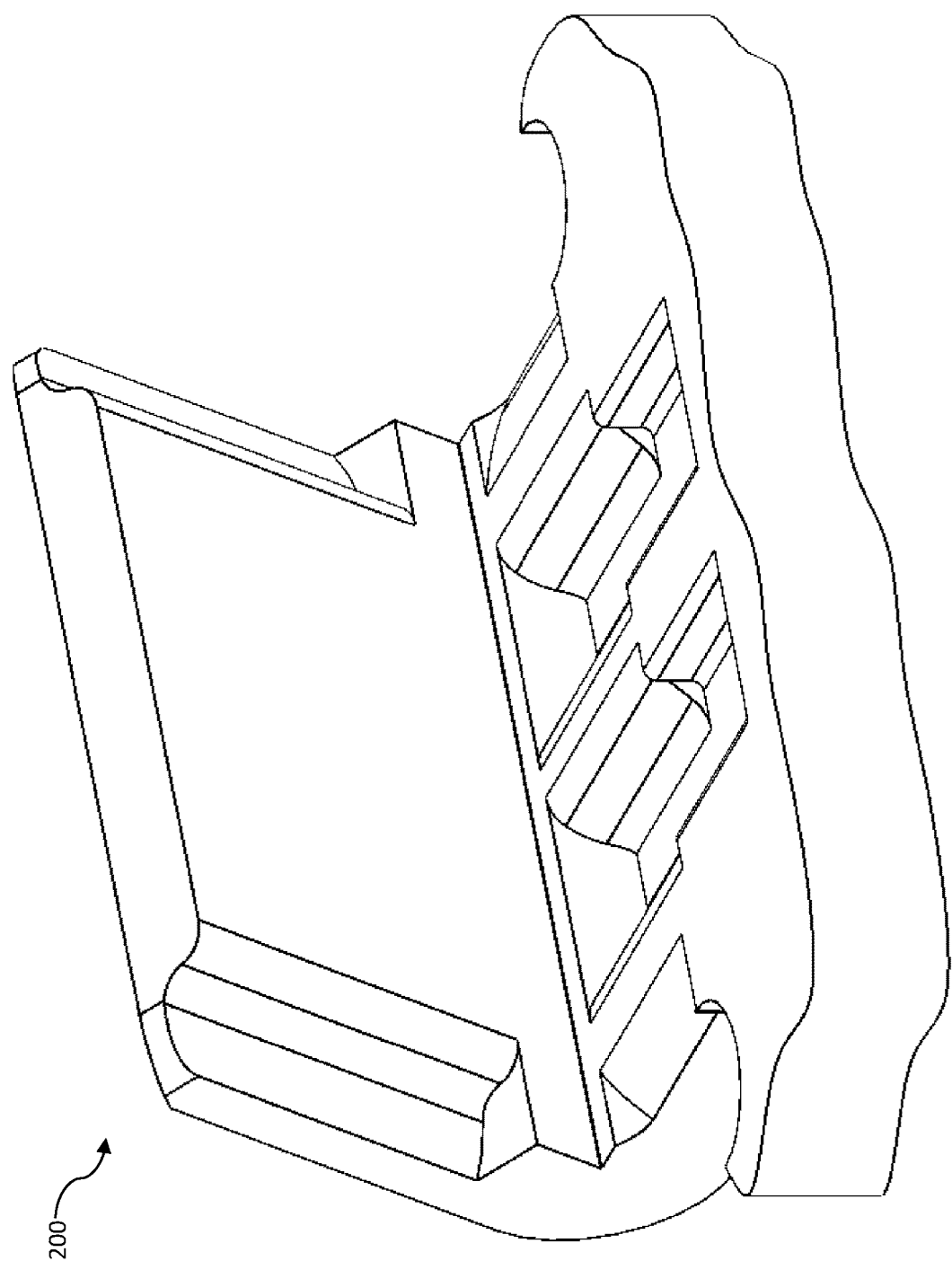
FIG. 2 is a perspective view of another exemplary shape memory alloy interlock assembly prior to crimping, in accordance with the principles of the present disclosure.

In order to increase the reliability of SMA wire crimps that are to hold SMA wire (or filament), and to provide long-term consistent wire pull force and consistent electrical contact during life of product, an exemplary SMA Interlock Assembly 100 is shown and described with reference to FIGS. 1A-IC. Interlocking features 110, 112 on the interlock assembly 100 consist of male portion 110 and female portion 112. The male portion 110 embeds and interlocks into the female portion 112 during the bending and crimping process. During crimping, male portion 110 deforms plastically and expands to fill the volume of the female portion 112. In other words, the material is compressed in the Z-direction 130, and expands in X- and Y-directions 140 against the walls of the female portion 112 Expansion is constrained by the walls of the female portion 112. The volumetric difference between this also results in cold welding between the interlocking surfaces, which result in large friction forces that prevent the crimp 100 from opening. As a brief aside, cold welding occurs when the two surfaces (of male 110 and female 112 portions) are forced together in the absence of heat with high force, so that the surface oxide films and asperities are broken, and adhesion occurs Remaining portions of the SMA filament assembly are described in co-owned U.S. patent application Ser. No. 13/372,199 filed on Feb. 13, 2012 and entitled "Apparatus and Methods for Filament Crimping and Manufacturing", now U.S. Pat. No. 8,939,180, which is a divisional of and claims priority to co-owned U.S. patent application Ser. No. 12/892,208 filed Jul. 1, 2010 of the same title, now U.S. Pat. No. 8,113,243; which is a divisional of and claims priority to co-owned U.S. patent application Ser. No. 12/691,562 filed Jan. 21, 2010 of the same title, now U.S. Pat. No. 7,926,520, which is a divisional of and claims priority to co-owned U.S. patent application Ser. No. 11/473,567 filed Jun. 22, 2006 of the same title, now U.S. Pat. No. 7,650,914, each of the foregoing incorporated herein by reference in its entirety.

The interlocking design serves to increase the reliability of the crimp, preventing the crimp from losing electrical and mechanical connection with an SMA wire 150 that is inserted therein. The prior crimp design, as described in co-owned U.S. patent application Ser. No. 13/372,199 filed on Feb. 13, 2012 and entitled "Apparatus and Methods for Filament Crimping and Manufacturing", now U.S. Pat. No. 8,939,180; which is a divisional of and claims priority to co-owned U.S. patent application Ser. No. 12/892,208 filed Jul. 1, 2010 of the same title, now U.S. Pat. No. 8,113,243; which is a divisional of and claims priority to co-owned U.S. patent application Ser. No. 12/691,562 filed Jan. 21, 2010 of the same title, now U.S. Pat. No. 7,926,520, which is a divisional of and claims priority to co-owned U.S. patent application Ser. No. 11/473,567 filed Jun. 22, 2006 of the same title, now U.S. Pat. No. 7,650,914, the contents of each of the foregoing incorporated supra, is considered a "cantilever" design, since the main constraint is provided by the "book fold" itself. However, the disclosed SMA crimp interlock assembly provides constraints from both sides of crimp, i.e. from the fold on one side of the crimp and from interlocking feature (male portion 110, female portion 112) on the other side. This results in a bridge design, with constraints on both sides, versus a so-called "cantilever design", with a constraint on one side only.

The interlocking features 110, 112 can be implemented with various configurations. For example, female portion 112 may have a "negative" angle (tapered) surfaces instead of vertical surfaces. In other words, the interlocking features may work as a "dovetail" design.

It will be appreciated that while certain steps and aspects of the various methods and apparatus described herein may be performed by a human being, the disclosed aspects and individual methods and apparatus are generally computerized/computer-implemented. Computerized apparatus and methods may be necessary to fully implement these aspects for any number of reasons including, without limitation, commercial viability, practicality, and even feasibility (i.e., certain steps/processes simply cannot be performed by a human being in any viable fashion).

It will be recognized that while certain aspects of the disclosure are described in terms of specific design examples, these descriptions are only illustrative of the broader methods, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure, the scope of which should be determined with reference to the claims.

What is claimed is:

1. A filament crimping element, the filament crimping element comprising:
   a metal structure comprising a three-dimensional volume, the metal structure comprising a first interior planar surface and a second interior planar surface, the first interior planar surface and the second interior planar surface opposing one another when the filament crimping element is crimped, both the first interior planar surface and the second interior planar surface defining an external perimeter for the three-dimensional volume;
   a first plurality of cavities disposed in the metal structure, the first plurality of cavities disposed at a spacing which creates a first plurality of features, the first plurality of cavities and the first plurality of features being disposed within the three-dimensional volume on the first interior planar surface on a first side of a fold line;
   a second plurality of cavities disposed in the metal structure, the second plurality of cavities disposed at a spacing which creates a second plurality of features, the second plurality of cavities and the second plurality of features being disposed within the three-dimensional volume on the second interior planar surface on a second opposing side of the fold line from the first side of the fold line; and
   a plurality of interlocking features disposed within the three-dimensional volume of the metal structure that are configured for cold welding the filament crimping element, the plurality of interlocking features comprising one or more male portions and one or more female portions, the one or more male portions being disposed adjacent the first plurality of features on the first interior planar surface and the one or more female portions being disposed adjacent the second plurality of cavities on the second interior planar surface, the one or more female portions being disposed within the external perimeter for the three-dimensional volume, respective ones of the one or more male portions being received within respective ones of the one or more female portions when the filament crimping element is crimped;
   wherein the filament crimping element is configured such that the first and second pluralities of cavities are substantially opposite to yet substantially offset from one another when the filament crimping element is crimped; and
   wherein the filament crimping element is configured such that the first and second pluralities of cavities and features form a substantially serpentine channel therebetween for receiving a filament when the filament crimping element is crimped.

2. The filament crimping element of claim 1, wherein the first plurality of features and the second plurality of features capture the filament in the substantially serpentine channel when the filament crimping element is crimped.

3. The filament crimping element of claim 2, wherein the one or more male portions are configured to at least partly plastically expand during crimping of the filament crimping element to at least partly fill the respective ones of the one or more female portions.

4. The filament crimping element of claim 3, wherein the plastic expansion of the one or more male portions comprises an expansion in a first direction and an expansion in a second direction as a result of compression in a third direction, the third direction being normal to both the first direction and the second direction.

5. The filament crimping element of claim 4, wherein the expansion in the first direction and the expansion in the second direction as a result of the compression in the third direction results in the cold welding of the plurality of interlocking features.

6. The filament crimping element of claim 4, wherein the one or more female portions comprises a tapered surface.

7. A filament crimping element, the filament crimping element comprising:
   a first crimp element, the first crimp element comprising: (i) a first interlock portion, and (ii) a first filament restraining portion, the first interlock portion and the first filament restraining portion being disposed within a first interior planar surface of the first crimp element adjacent to one another;
   a second crimp element being disposed in opposition to the first crimp element, the second crimp element comprising: (i) a second interlock portion, and (ii) a second filament restraining portion, the second interlock portion and the second filament restraining portion being disposed within a second interior planar surface of the second crimp element adjacent to one another; and
   the first interior planar surface of the first crimp element opposes the second interior planar surface of the second crimp element oppose when the first crimp element and the second crimp element are crimped;
   wherein the filament crimping element is configured such that when the first crimp element and the second crimp element are crimped around an SMA filament:
     the first interlock portion engages with the second interlock portion to frustrate movement of the first crimp element away from the second crimp element after crimping; and the first filament restraining portion and the second filament restraining portion cooperate to restrain the SMA filament therebetween without damaging one or more mechanical properties of the SMA filament.

8. The filament crimping element of claim 7, wherein the first interlock portion comprises a male feature and the second interlock portion comprises a female feature and the engagement of the male feature with the female feature results in a cold-welded joint.

9. The filament crimping element of claim 8, wherein the male feature is configured to plastically expand within the female feature when the first crimp element and the second crimp element are crimped around the SMA filament.

10. The filament crimping element of claim 9, wherein the first crimp element comprises a first tapered surface external to the first filament restraining portion; and
wherein the second crimp element comprises a second tapered surface external to the second filament restraining portion.

11. The filament crimping element of claim 10, wherein the first tapered surface tapers away from the second tapered surface when the first crimp element and the second crimp element are crimped around the SMA filament.

12. The filament crimping element of claim 8, wherein the engagement of the male feature with the female feature results in plastic deformation of the male feature.

13. The filament crimping element of claim 8, wherein the plastic deformation of the male feature comprises an expansion in a first direction and an expansion in a second direction as a result of compression in a third direction, the third direction being normal to both the first direction and the second direction.

14. The filament crimping element of claim 7, wherein the first interlock portion comprises a male feature and the second interlock portion comprises a female feature, the female feature comprising a tapered surface.

15. The filament crimping element of claim 14, wherein the male feature is configured to plastically expand within the female feature when the first crimp element and the second crimp element are crimped around the SMA filament.

16. The filament crimping element of claim 15, wherein plastic deformation of the male feature comprises an expansion in a first direction and an expansion in a second direction as a result of compression in a third direction, the third direction being normal to both the first direction and the second direction.

17. The filament crimping element of claim 16, wherein the expansion in the first direction and the expansion in the second direction as a result of the compression in the third direction results in cold welding of the first crimp element to the second crimp element.

* * * * *